United States Patent [19]

Sato et al.

[11] Patent Number: 5,896,204
[45] Date of Patent: *Apr. 20, 1999

[54] FACSIMILE APPARATUS

[75] Inventors: Akemi Sato, Kawasaki; Shunichi Tachibana, Urayasu; Kaori Nakagawa; Masashi Kimura, both of Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/354,115

[22] Filed: Dec. 6, 1994

[30] Foreign Application Priority Data

Dec. 6, 1993 [JP] Japan .................................. 5-305304
Dec. 6, 1993 [JP] Japan .................................. 5-305306
Dec. 6, 1993 [JP] Japan .................................. 5-305312
Dec. 6, 1993 [JP] Japan .................................. 5-305313

[51] Int. Cl.⁶ ............................................ H04N 1/00
[52] U.S. Cl. ............................ 358/405; 358/434; 358/437
[58] Field of Search ................................ 358/405, 400, 358/403, 404, 434, 437, 444; 379/100

[56] References Cited

U.S. PATENT DOCUMENTS 5,309,507  5/1994  Hosaka ........................ 358/437
5,335,085  8/1994  Nakatsuma .................... 358/405

FOREIGN PATENT DOCUMENTS 3-289886  12/1991  Japan.

OTHER PUBLICATIONS

Canon Fax-L770 Instruction Book, Canon Inc. 1990, p. 55.

*Primary Examiner*—Thomas D. Lee
*Attorney, Agent, or Firm*—Fitzpatrick, Cella, Harper & Scinto

[57] ABSTRACT

A facsimile apparatus capable of recalling a destination for retransmission when the transmission ends with a transmission error, comprises a memory unit for storing image data page by page; a transmission unit for transmitting the image data stored in said memory unit page by page; a detection unit for detecting a transmission error during the transmission of the image data by said transmission unit; an error page memory unit for storing a transmission error page based on the detection result by said detection unit; a line control unit for terminating the transmission with error and recalling the error terminated destination based on the detection of the transmission error by said detection unit; and a retransmission unit for causing said transmission unit to retransmit the image data stored in said memory unit from the error page stored in said error page memory unit after the line connection by the recalling by said line control unit.

16 Claims, 14 Drawing Sheets

| REGISTRATION ITEM | ERROR RESEND PAGES |

| CONTENTS TO BE SELECTED | RESEND ALL PAGES |

| RESEND ERROR PAGE ET SEQ. |

| RESEND 1ST PAGE PLUS ERROR PAGE ET SEQ. |

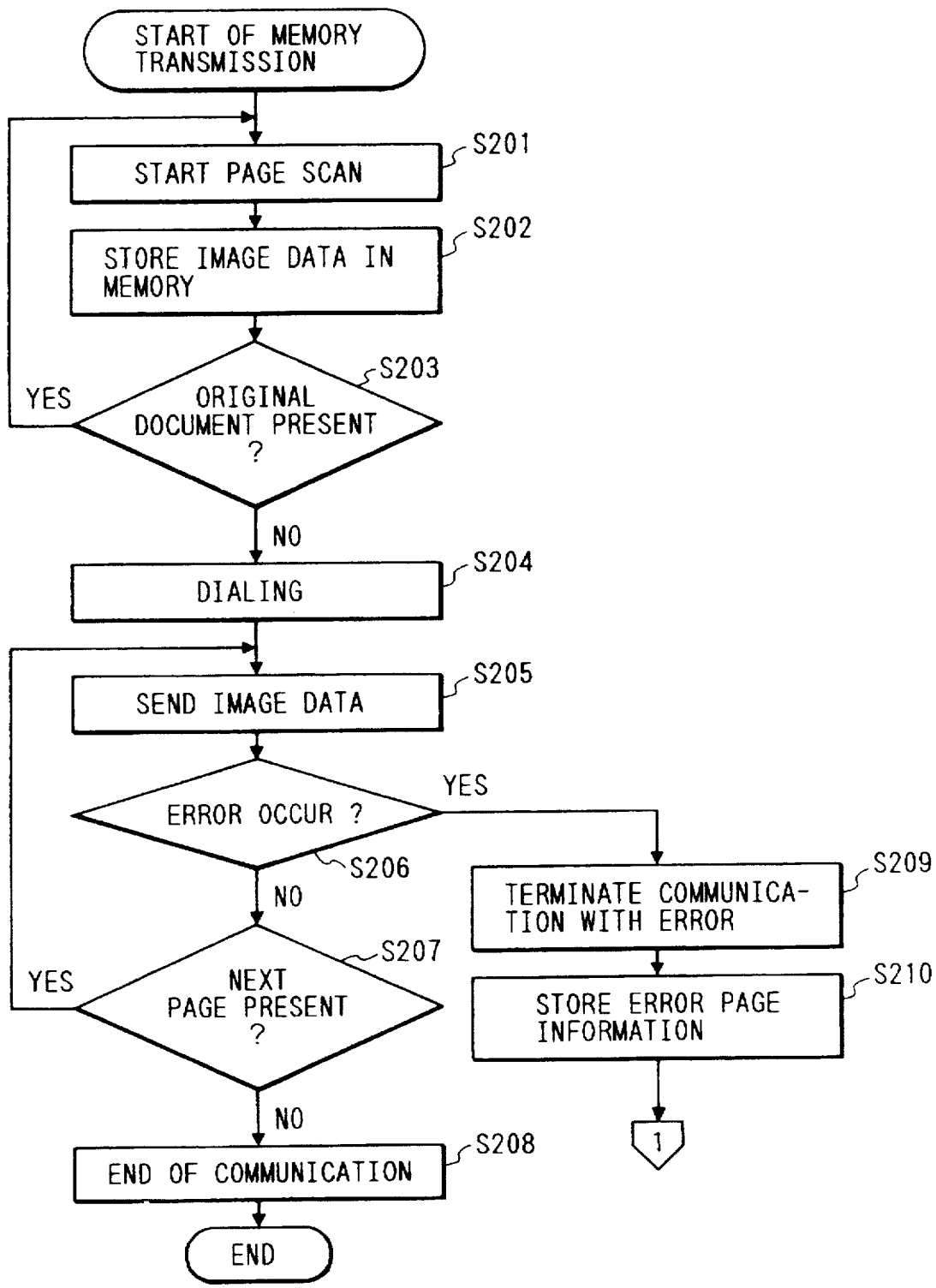

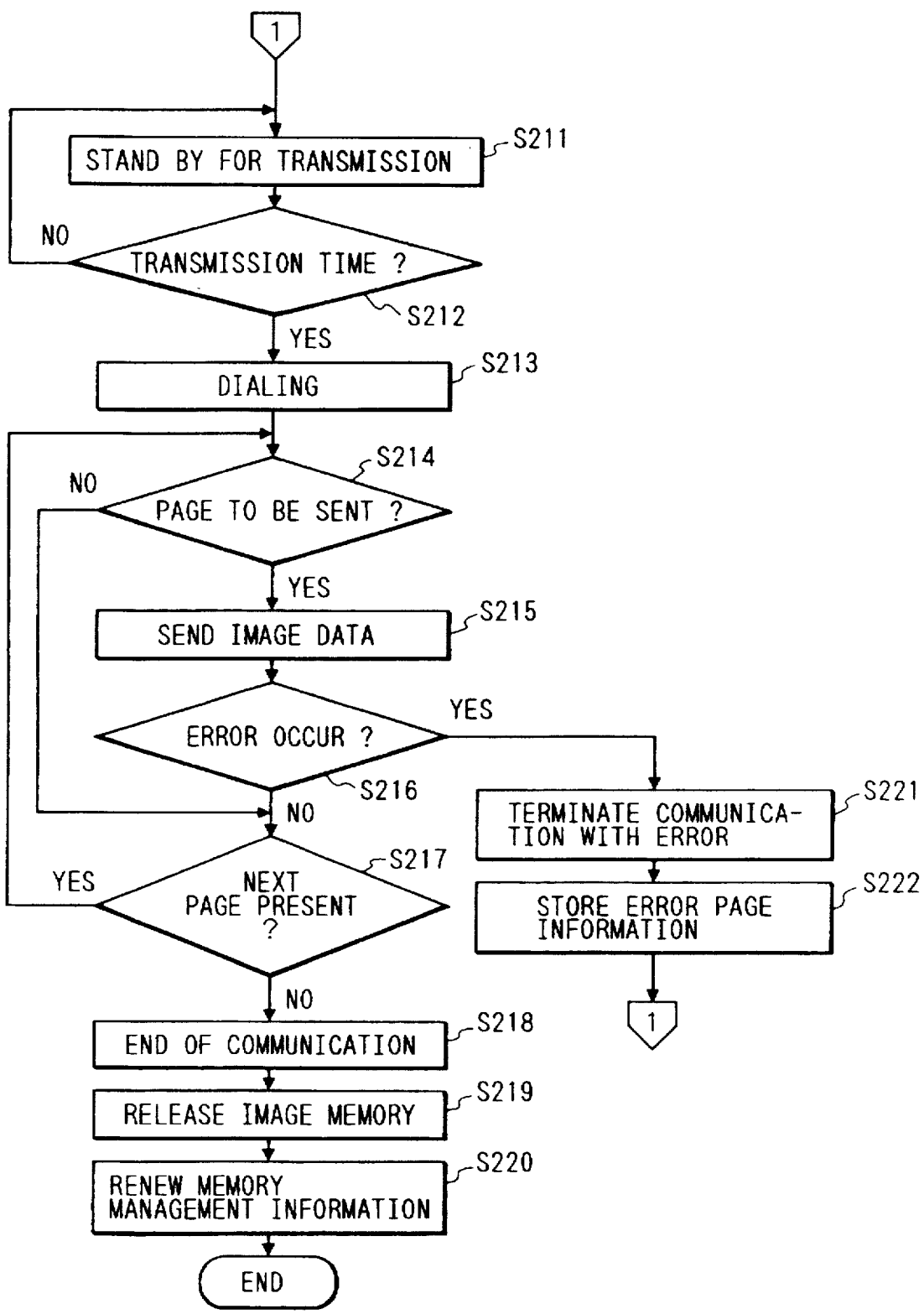

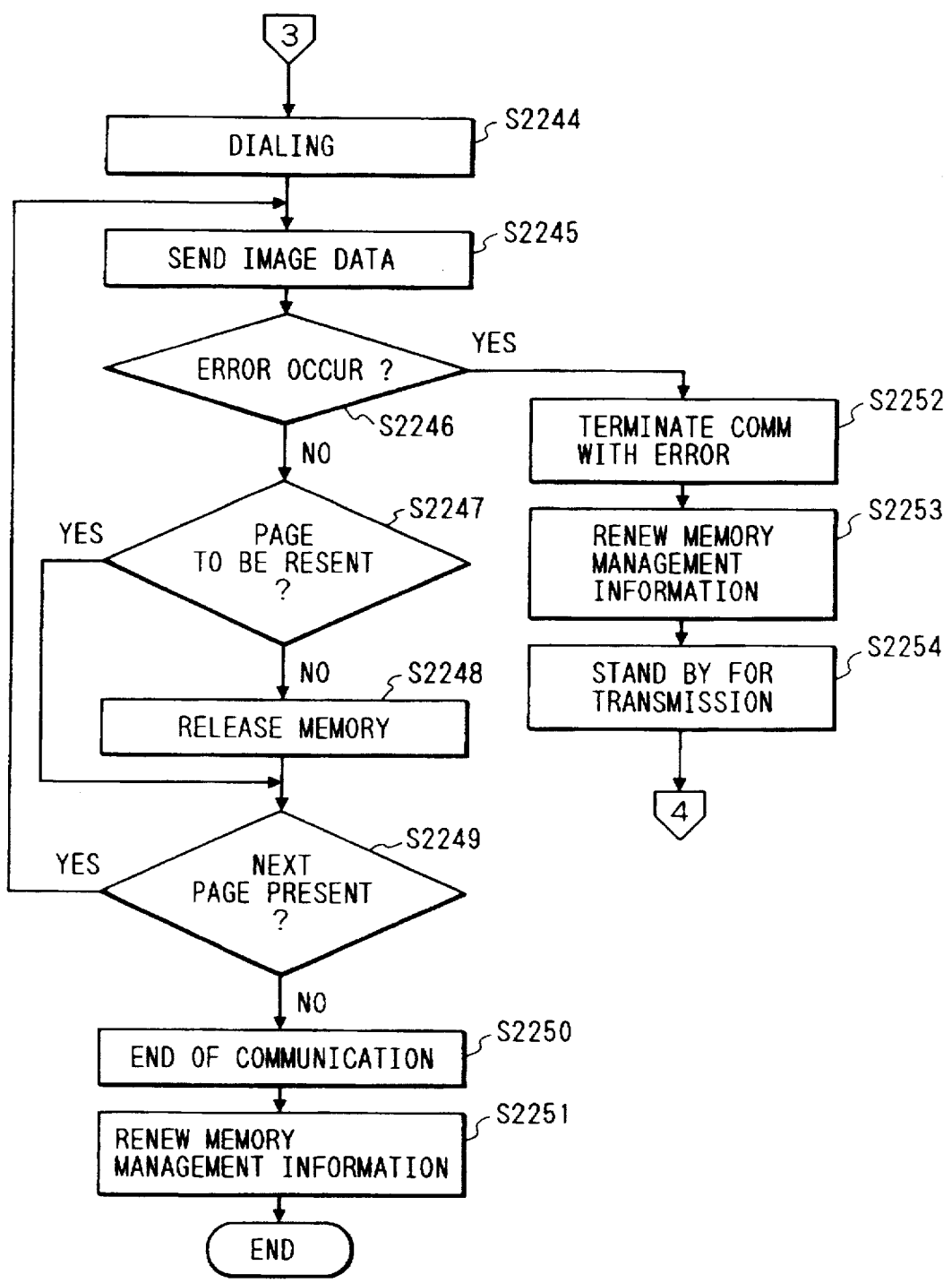

FACSIMILE APPARATUS

BACKGROUND OF THE INVENTION

1. Field of the Invention

The present invention relates to a facsimile apparatus having an image memory.

2. Related Background Art

In prior art memory transmission, when an image ended with transmission error is to be retransmitted, the retransmission is made starting from the top page of the document sheets. Thus, the images of the pages which were normally transmitted are also retransmitted.

In the prior art, when the image which ended with the transmission error is to be retransmitted, the images of the pages which were normally transmitted are also retransmitted so that a receiving station receives the same images, which leads to a low efficiency.

In prior art direct transmission, the reading is stopped when an error occurs and an image memory is released. Thus, image data is not left in the memory and the retransmission cannot be conducted. Further, when an error occurs, the document sheets occupy a document sheet table.

In the prior art, when the error occurs in the direct transmission, it is necessary to retransmit by the intervention of an operator in order to retransmit the error image data.

In prior art memory transmission, when a communication error occurs, the transmission is stopped and all image data is held in the memory. Accordingly, in the retransmission, the pages which were normally transmitted are also retransmitted.

In the prior art, when the image ended with the transmission error is to be retransmitted, the pages which were normally transmitted are also retransmitted.

Further, in the prior art memory transmission, when a plurality of transmissions are reserved to one destination, the image file to be next transmitted is set in accordance with the transmission time registration and the reservation order. Thus, the transmission of other images are prioritized over the retransmission for the image ended with the transmission error, and the receiving station received the error image file and the retransmission image file separately and disorderly.

In the prior art, the transmission of the other images is prioritized over the retransmission of the image ended with the transmission error, and the error image file and the retransmission image file are separated disorderly so that the arrangement of the received sheets is complex.

SUMMARY OF THE INVENTION

It is an object of the present invention to improve the facsimile apparatus.

It is another object of the present invention to provide a registration function for designating pages to be transmitted in the retransmission of the communication error image to shorten the transmission time.

It is still another object of the present invention to provide a facsimile apparatus which permits the error retransmission by storing the remaining document sheets when the direct transmission is stopped.

It is still another object of the present invention to provide a facsimile apparatus which releases the image data for the pages ended with normal transmission from the image memory to permit the effective use of the memory of the facsimile apparatus, and transmits the image data of the pages of and following to the transmission error page to shorten the transmission time.

It is still another object of the present invention to prioritize the retransmission of the communication error image when a plurality of transmissions are reserved in order to assure convenience in the receiving station.

BRIEF DESCRIPTION OF THE DRAWINGS

FIG. 3 shows a flow chart of the embodiment of the present invention.

FIG. 4 shows a flow chart of the embodiment of the present invention.

FIG. 13 shows a flow chart of the fourth embodiment.

DETAILED DESCRIPTION OF THE PREFERRED EMBODIMENTS

EMBODIMENT 1

Figure 1:
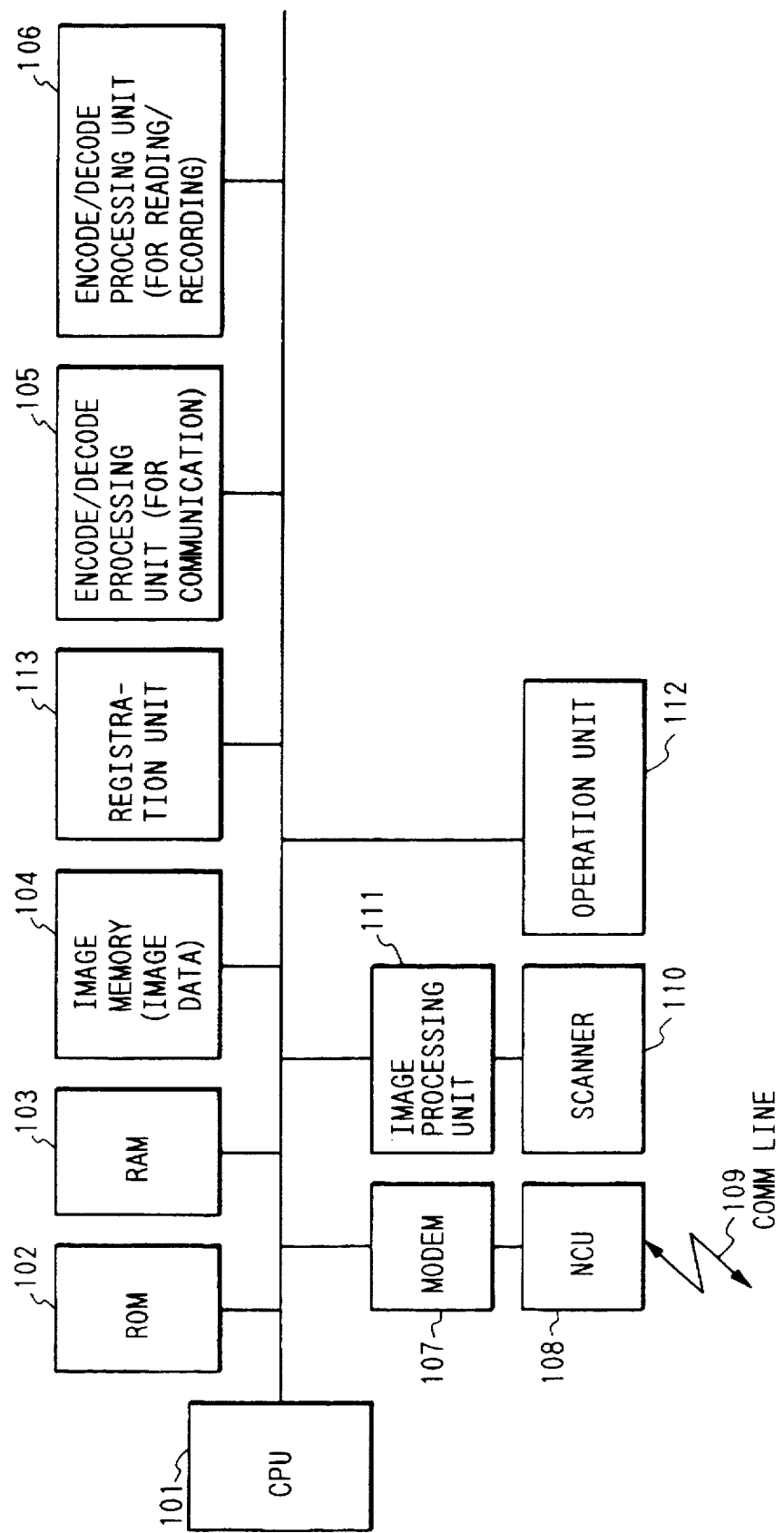
FIG. 1 shows a system block diagram of an embodiment of a facsimile apparatus of the present invention.

Referring to the drawings, detail of Embodiment 1 is now explained in detail.

FIG. 1 shows a system block diagram of the Embodiment 1.

A CPU 101 is a system control unit which controls the overall apparatus. A ROM 102 stores a control program of the CPU. A RAM 103 is used as a work area of the CPU 101 as required. The RAM 103 stores image management information such as accept numbers, destination information, page information, image memory address information and image attributes. An image memory 104 comprises a DRAM and stores the image data. A communication coding/decoding processing unit 105 and a read coding/decoding processing unit 106 encode and decode the image data handled by the facsimile apparatus. A modem (modulator/demodulator) 107 modulates and demodulates the facsimile transmission and receive signals. An NCU (network control unit) 108 has a function to send out a select signal (dialing pulse or tone dialer) to a communication line 109 and detects a call signal to conduct an automatic call receive operation and a line control operation. A scanner 110 comprises a CS image sensor and a document sheet carrying mechanism, and optically reads a document sheet to convert it to an electrical image data, which is corrected by an image processing unit 111 and outputted as a fine image data. An operation unit (or console unit 112 comprises a keyboard to permit an operator to enter various inputs. A registration unit 113 comprises an SRAM and stores and reads out settings for the control of the operation.

Figures 2A, 2B, 2C, 2D:
FIGS. 2A to 2D show registration means of the embodiment.

FIG. 2 shows a content of registration for a page to be retransmitted for a communication error image.

FIG. 3 shows a process flow in the memory transmission and a process flow in the transmission error.

FIG. 4 shows a process flow in the retransmission.

The operator operates the console unit 112 to set in an item "Designate pages to be transmitted in communication error image retransmission" (a) "Retransmit all pages" (b), "Transmit pages on and after communication error page" (c) or "transmit 1st page and pages on and after communication error page" (d) (see FIGS. 2A to 2D).

As the memory transmission is started, the process starts from s201. (see FIG. 3)

A one page scan start trigger is applied to the scanner 110 to start the reading (s201), and data encoded by the read encode/decode processing unit 105 is stored in the image memory 104 to prepare a transmission file (s202). When absence of document sheet is detected (s203), the read operation is terminated and dialing is made to call a destination station (s204). When the call is established and communication preprotocol is conducted, the image data for each page is encoded by the communication encode/decode processing unit 106 based on the memory management information stored in the RAM 103 and it is sent out to the transmission line through the modem 107 and the NCU 108 (s205). If one page is normally transmitted without detecting a communication error (s206) and the next page image is present (s207), the process returns to s205. If the next document sheet is not present, the communication is terminated (s208).

When a communication error is detected, the communication is terminated (s209), and the page number of the error page is stored in the memory management data of the RAM 103 in association with the file which ended with the communication error (s210) and the process shifts to a transmission stand-by state (s211).

When a transmission time reaches after a redialing interval (s212), the dialing is made (s213), and when the call is established, the image data is transmitted. In the procedure of transmission, whether the page is designated as the retransmission page in the registration unit 113 or not is checked starting from the top page of the image (s214), and if it is, the image data is transmitted (s215). If it is not, whether the next page is the designated page or not is checked. This step is repeated to search the designated page. When one page of image is normally transmitted (s216) and the next page is present (s217), the process returns to s214. After the transmission of all pages to be transmitted (s218), the image memory is released (s219), the memory management information is update (s220) and the process is terminated. If a communication error is detected in s216, the process is terminated in error mode (s221) and the information of the error page is written into the memory management data (s222), and the process shifts to the transmission stand-by state.

In the present embodiment, in the memory transmission, the error is detected by the communication error detection means, and the information relating to the page ended with the communication error is stored by the memory management means, and in the retransmission, only the pages designated by the registration means is transmitted to shorten the transmission time and provide an economic function.

EMBODIMENT 2

In the Embodiment 2, the retransmission process when the communication is ended with error during the direct transmission is explained.

The like elements to those of the Embodiment 1 omitted for the explanation.

Figure 5:
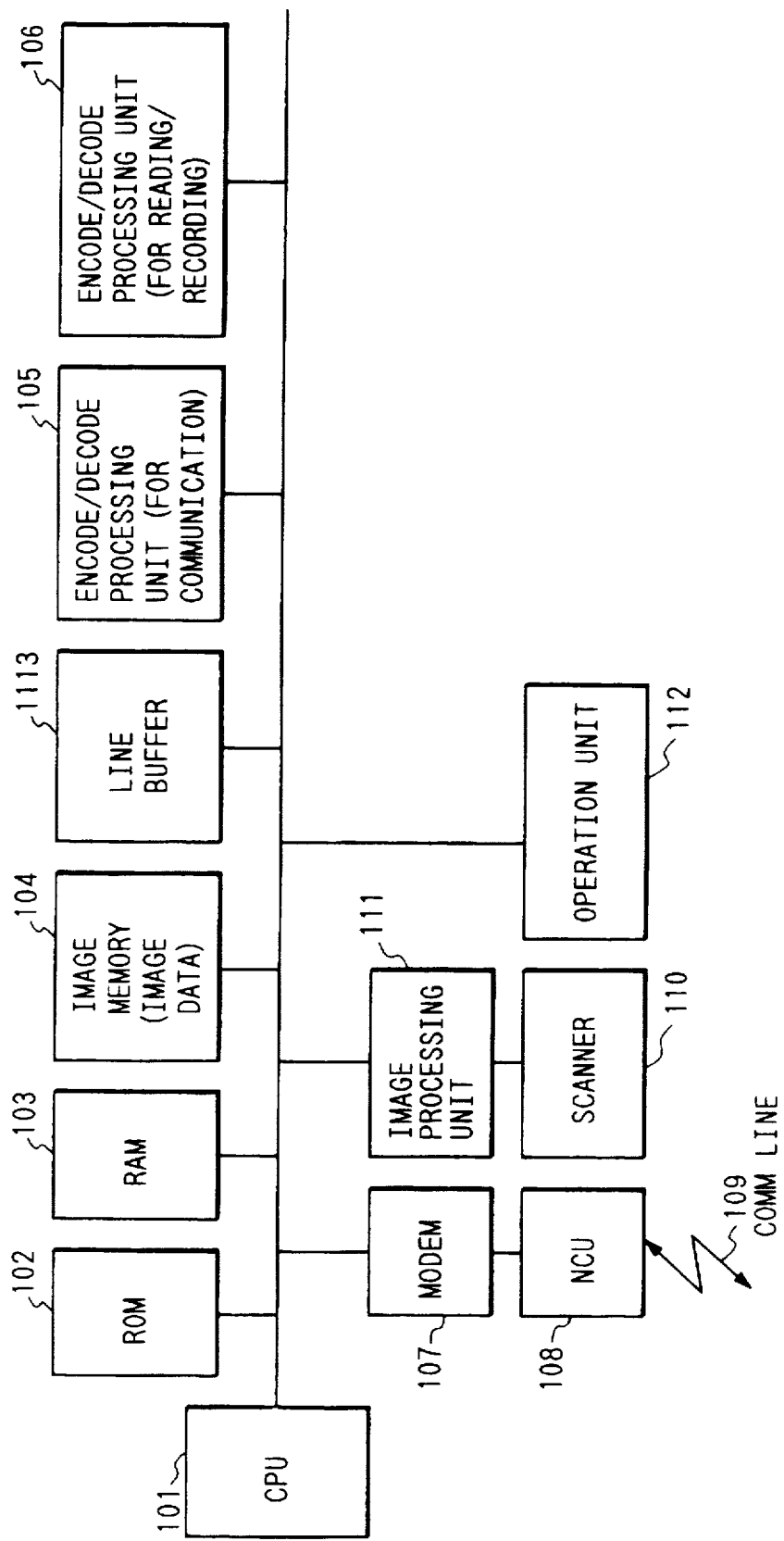
FIG. 5 shows a system block diagram of a second embodiment of the facsimile apparatus of the present invention.

FIG. 5 shows a system block diagram of the Embodiment 2.

A line buffer 1113 is used in the image data transmission.

Figure 6:
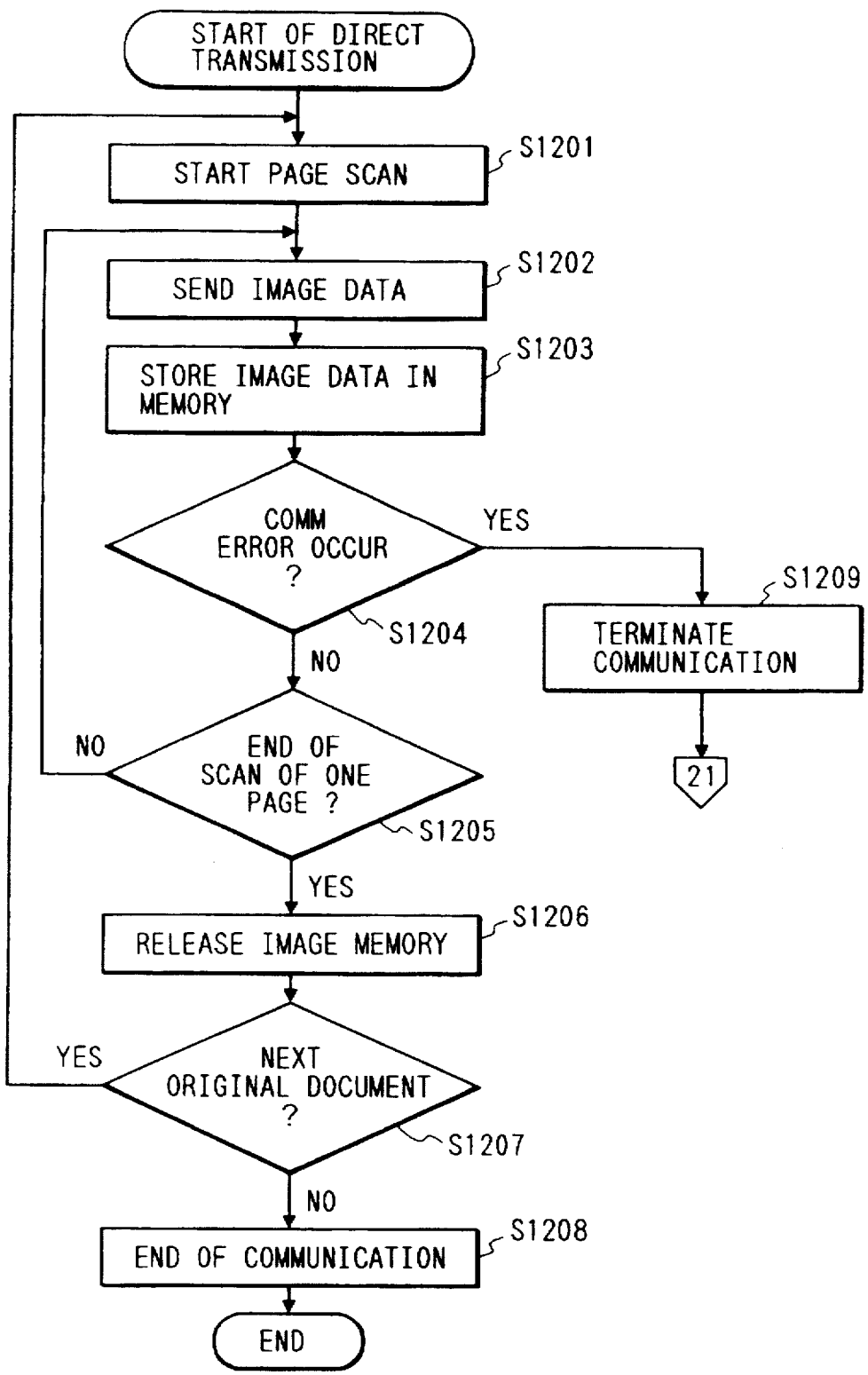
FIG. 6 shows a flow chart of the embodiment.
Figure 7:
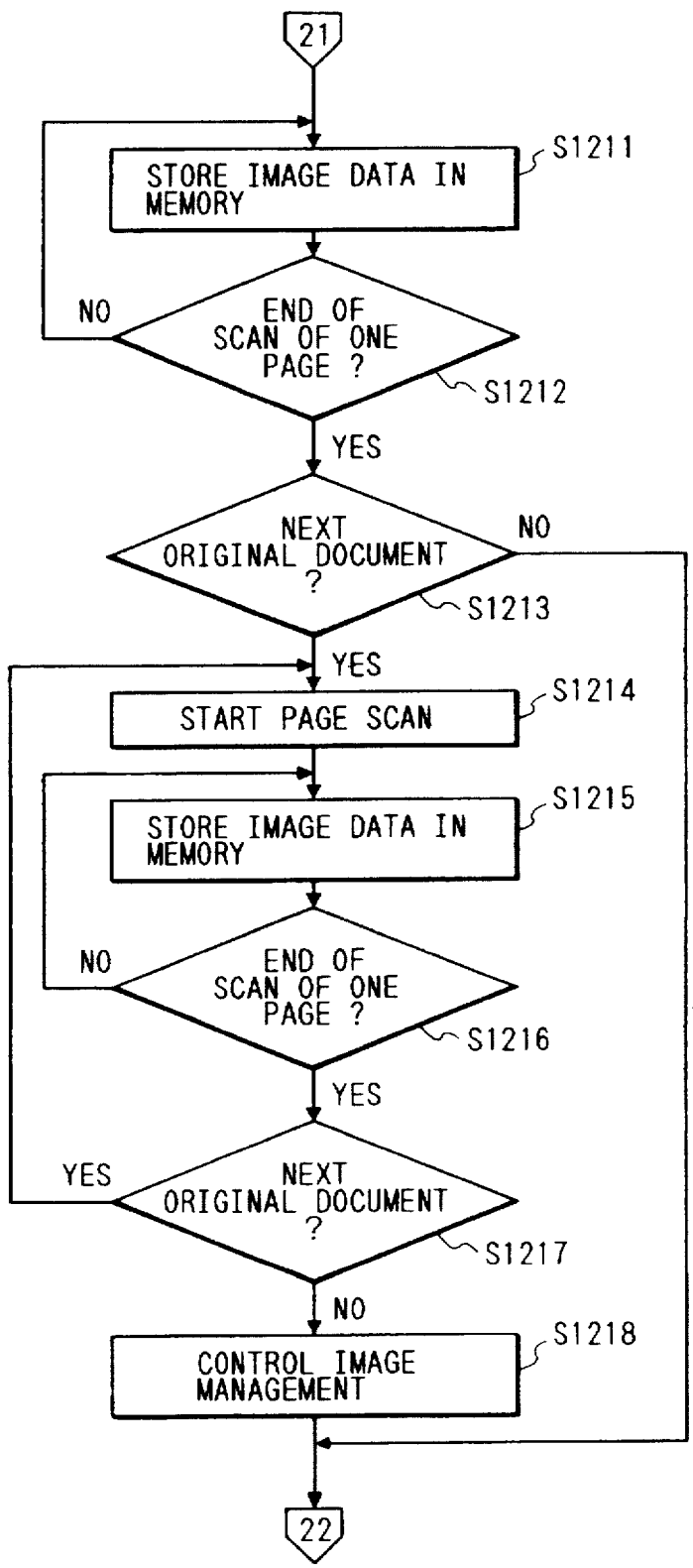
FIG. 7 shows a flow chart of the embodiment.

FIGS. 6 and 7 show a process flow in the direct transmission and a process flow when an error occurs.

Figure 8:
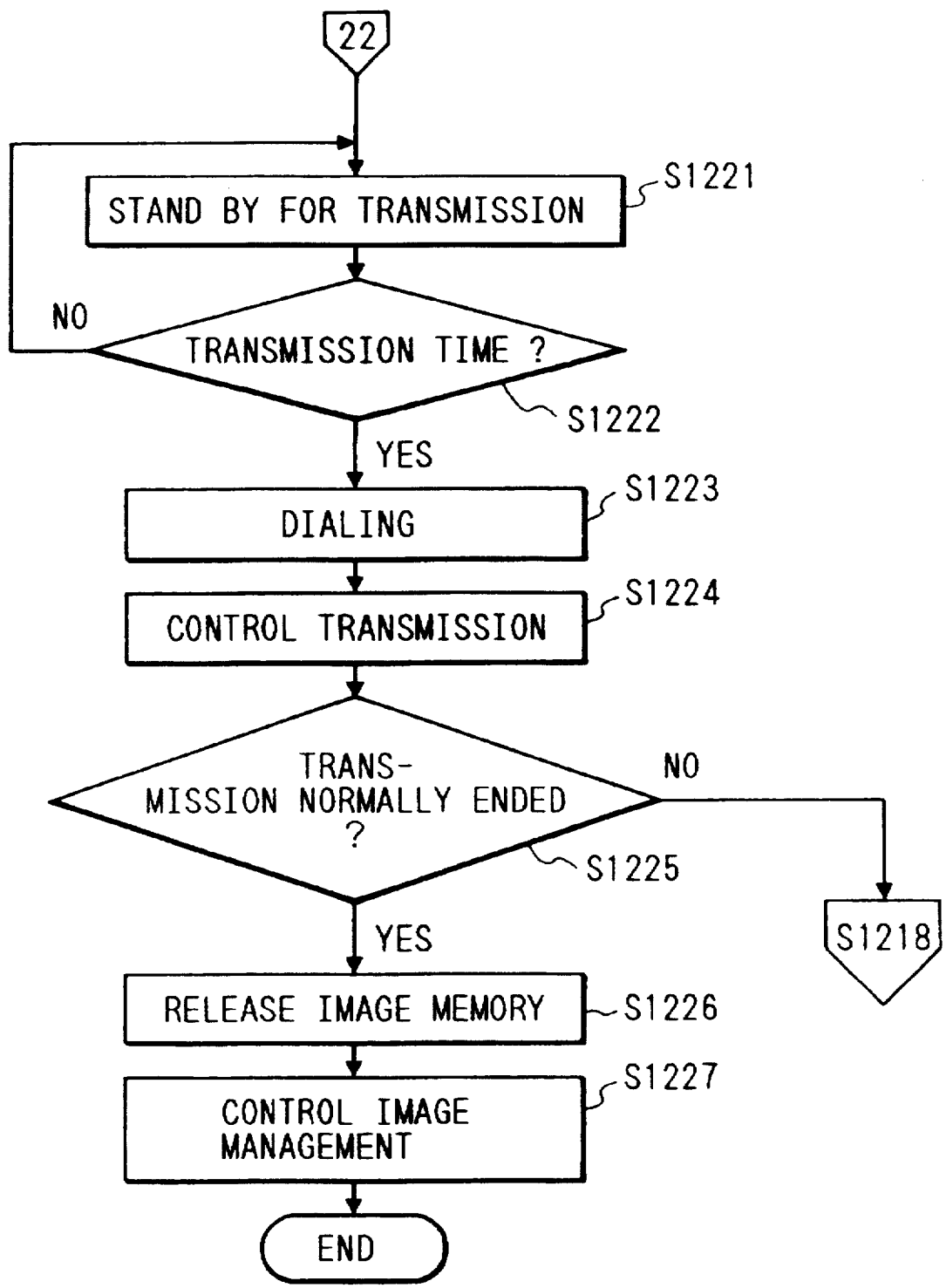
FIG. 8 shows a flow chart of the embodiment.

FIG. 8 shows a process flow in the retransmission.

When the direct transmission is started, the process starts from s1201.

A one page scan start trigger is applied to the scanner 110 to start the reading (s1201), and the read image data is encoded by the communication encode/decode processing unit 105, and it is sent out to the transmission line through the modem 107 and the NCU 108 (s1202).

The data encoded by the communication encode/decode processing unit 105 is stored in the image memory 104 (s1203).

When one page of data is normally transmitted, the image memory which stores the image data is released (s1206), and if the next document sheet is detected (s1207), the process returns to s1202. If the next document sheet is not present, the communication is terminated (s1208).

When the communication error is detected in the direct communication (s1204), the communication is terminated (s1209).

The page which ended with the communication error is scanned and the image data thereof is stored in the image memory (s1211, s1212), and if the document sheet is detected (s1213), the remaining page is scanned (s1214) and the image data thereof is stored in the image memory (s1215).

If the absence of document sheet is detected (s1213, s1217), the total number of pages read and the information indicating the transmission error are written into the image management information (s1218) and the process shifts to the transmission stand-by state (s1221).

When a transmission time is reached after the redialing interval (s1222), the dialing process is conducted (s1223) and the transmission is conducted (s1224). If an error occurs in the transmission, the process returns to s1218 to conduct the transmission control of the error image (s1221 to s1225).

When the communication process ends normally, the image memory is released (s1226) and the image management information is saved and releases (s1227), and the process is terminated.

In the Embodiment 2, when the error occurs in the direct transmission and the communication is terminated on the half way, the image data of the remaining document sheets including the page under transmission is read by the read means and stored in the image memory, and the destination station is dialed by the dialing means to transmit the image indicating the termination by the transmission error by the image management information of the memory management means so that the retransmission for the error in the direct transmission is attained without intervention of the operator, and a user friendly function is provided.

EMBODIMENT 3

In the Embodiment 3, in addition to the functions of the Embodiment 1, a remaining capacity of the image memory is detected when the communication ends with error, and if the remaining capacity of the memory is smaller than a predetermined capacity, the image data of the normally transmitted pages is released from the memory to increase the remaining capacity of the memory as much as possible, and the process stands by for the retransmission.

In the Embodiment 3, the elements which are duplicates of the Embodiment 1 are designated by the same numerals and the explanation thereof is omitted.

A system block diagram of the facsimile apparatus of the Embodiment 3 is identical to that shown in FIG. 1.

Figure 9:
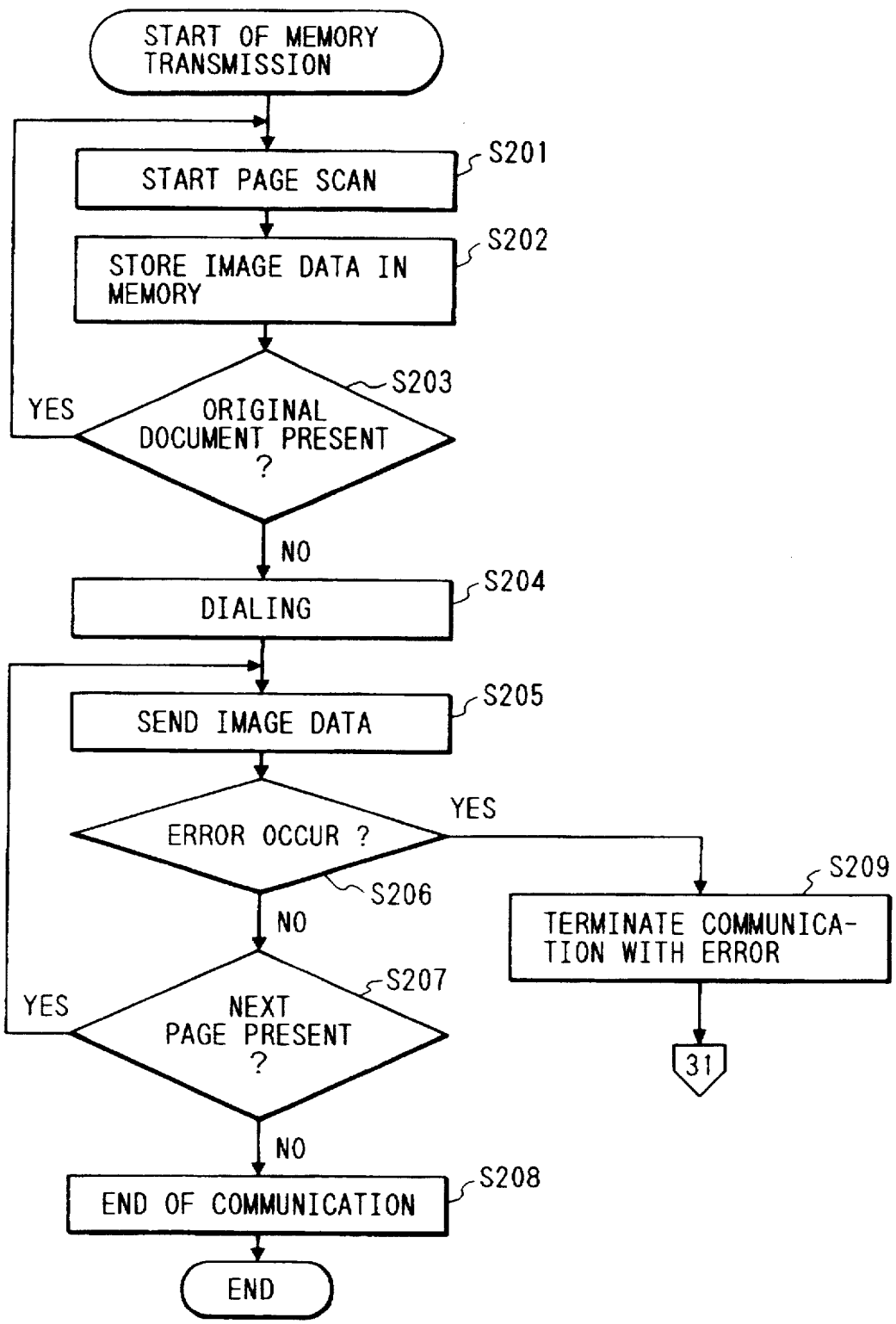
FIG. 9 shows a flow chart of a third embodiment.
Figure 10:
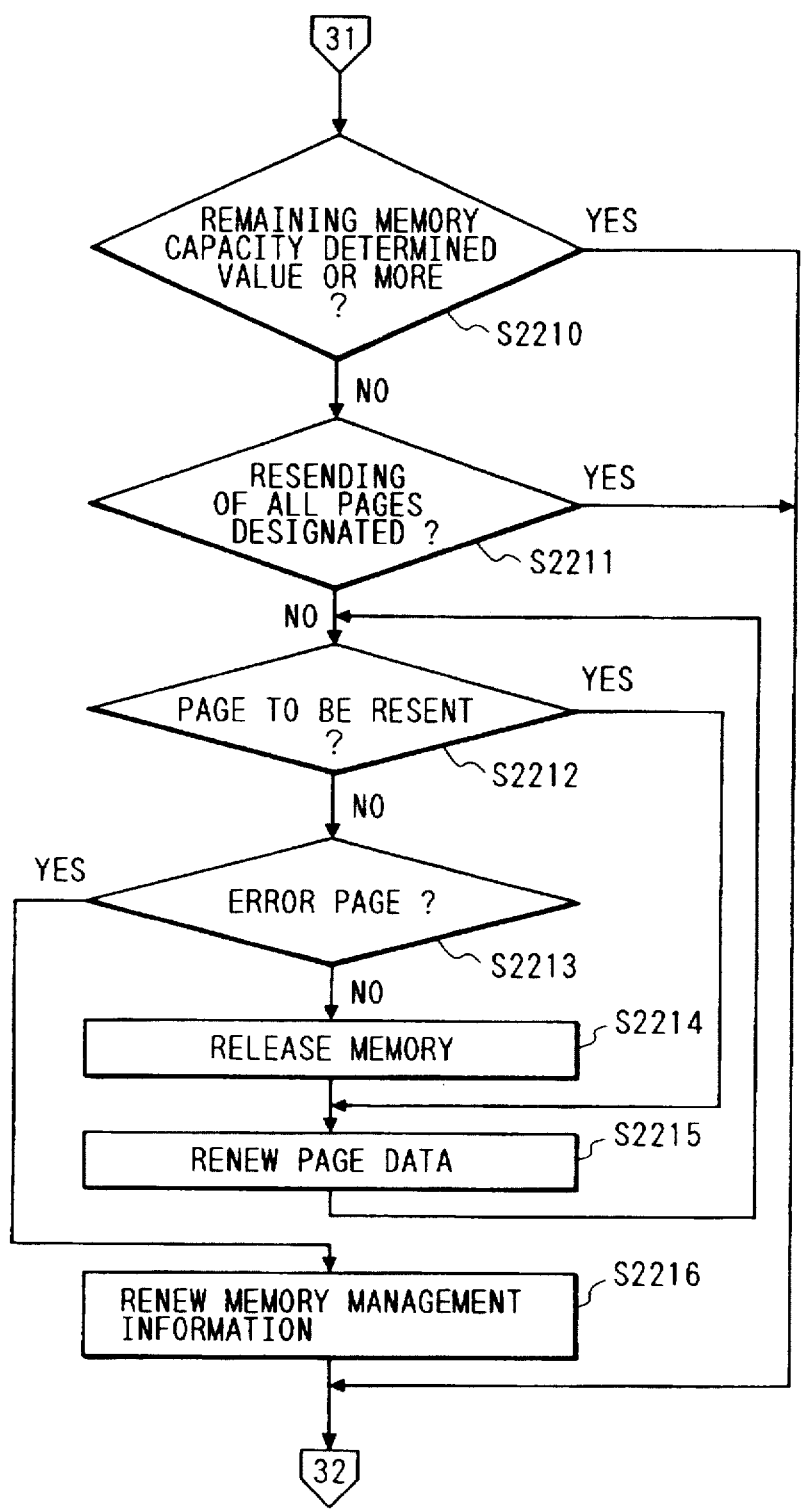
FIG. 10 shows a flow chart of the third embodiment.

FIGS. 9 and 10 show a process flow in the memory transmission of the Embodiment 3 and a process flow in the transmission error.

Figure 11:
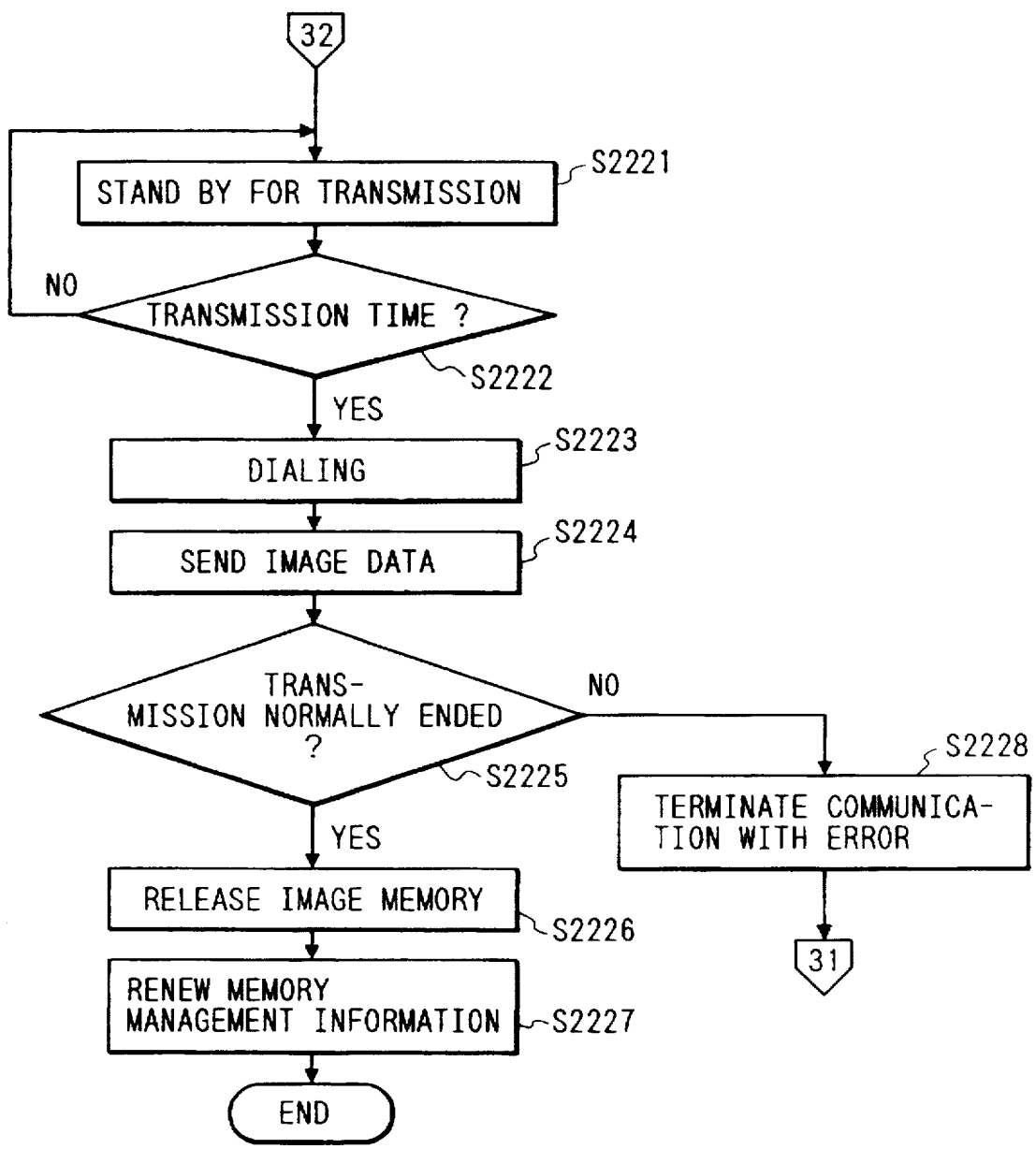
FIG. 11 shows a flow chart of the third embodiment.
Figure 12:
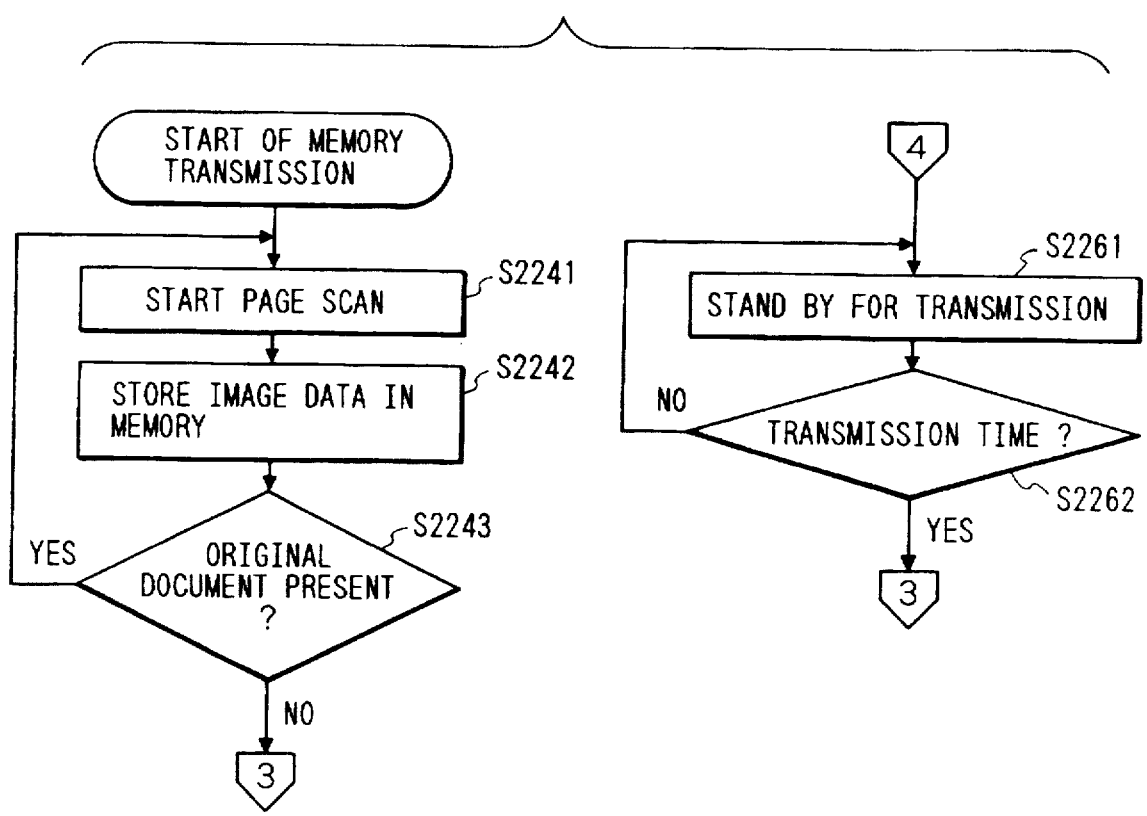
FIG. 12 shows a flow chart of a fourth embodiment.

FIG. 11 shows a process flow in the retransmission.

Referring to FIGS. 9 to 11, an operation of the CPU 101 is explained.

When the memory transmission is started, the process starts from s201. In the following operation, s201 to s209 are identical to those of the Embodiment 1.

In FIG. 9, when a communication error is detected (s206), the communication is terminated (s209), the remaining capacity of the memory is detected (s2210), and if the remaining capacity of the memory is larger than a predetermined capacity (YES in s2210), the image data of all pages is held in the image memory without regard to the content of registration in the registration unit 113 and the image data is not released. On the other hand, if the remaining capacity of the memory is not larger than the predetermined capacity (NO in s2210), the process proceeds to s2211 to release the image data in accordance with the content of registration in the registration unit 113. Depending on the content of the page to be retransmitted of the registration (b), (c) or (d) registered in the registration unit 113 as explained in FIG. 2 (s2211), if the setting is not "Retransmit all pages" (NO in s2211), the image data of the normally transmitted pages other than the pages to be retransmitted is released from the image memory (s2212, s2213 and s2214). In s2212, if the setting is "Transmit page on or after communication error page", the image data of the pages before the communication error page is released, and if the setting is "Transmit 1st page and the pages on and after the error page", the image data of the page 1 is not released but held, and the image data of the page on or after page 2 and before the error page is released. In s2215, the page data is updated for the next page determination.

When the communication error page is reached (YES in s2213), the total number of pages for the pages on and after the communication error page and the information indicating that the transmission ended with error are written into the memory management information (s2216), and the process shifts to the transmission stand-by state (s2221).

When the transmission time is reached after the redialing interval (s2222), the dialing is conducted (s2223), and after the call is established, the image data is transmitted (s2224). In s2224, the pages designated for the retransmission are sequentially transmitted in accordance with the content registered in the registration means. Whether the transmission of the image data normally is terminated or not is determined (s2225), and if the transmission of the image data is not normal, the communication is terminated with error (s2228) and the process returns to s2210.

When the communication process is normally terminate, the image memory is released to release the image data of all pages (s2226) and the memory management information is saved and releases (s2227), and the process is terminated.

EMBODIMENT 4

In the Embodiment 3, when the communication error is detected, the communication is terminated and the image data of the pages other than the pages to be retransmitted is released from the image memory in accordance with the content of registration. The present invention is not limited thereto. For example, when one page of transmission is normally terminated, the image data of the pages other than the pages to be retransmitted may be released from the image memory in accordance with the content of registration. An embodiment therefor is explained as the Embodiment 4.

Referring to flow charts of FIGS. 6 and 7, the memory release operation of the Embodiment 4 is explained. Like in s201 to s205 of the Embodiment 1, the document sheet is read (s2241), the image data is stored (s2242), the dialing is made (s2244), and the image data for each page is sent out to the communication line (s2245). When one page of transmission is normally completed without detecting the communication error (s2246) and the setting of the page to be transmitted in the registration content is "Transmit from communication error image" or "Retransmit 1st page and the pages on and after error page" and if the transmitted page is not the page to be retransmitted (s2247), the image data of the page having one page of transmission normally competed is released from the memory (s2248) and the memory management information is updated. When the next image page is present (s2249), the process returns to s2245. If it is not present (s2250), the data indicating the normal completion of communication is written into the management information (s2251) and the process is terminated.

When the communication error occurs during the communication (s2246), the communication is terminated (s2252), the data indicating the termination with communication error is written into the management information (s2253), and the process returns to the stand-by status for the retransmission of the error image (s254).

When the transmission time is reached after the redialing interval (s2261, s2262), the dialing is conducted (s2244) and the image data is retransmitted. The control to the retransmission is identical to that for the transmission of the image data described above.

In the Embodiments 3 and 4, in the memory transmission, the image memory for the pages having the transmission normally completed is released by the memory erase means under the control of the communication error detection means and the registration means, and the image memory for the pages having the transmission ended with error is held in the memory under the control of the communication error detection means and the registration means so that the facsimile memory is effectively utilized and the transmission time is shortened in the retransmission of the communication error image.

EMBODIMENT 5

In the Embodiment 5, during the stand-by for the retransmission due to the communication error, other communication to the destination station for which the communication error occurred is conducted while the mixing of the image data of the communication error data into the other image data at the destination station is prevented.

In the Embodiment 5, the like elements to those in the Embodiment 1 are designated by the like numerals and the explanation thereof is omitted.

A system block diagram of the Embodiment 5 is identical to that shown in FIG. 1.

A process flow of the memory transmission is identical to that shown in FIG. 2.

Figure 14:
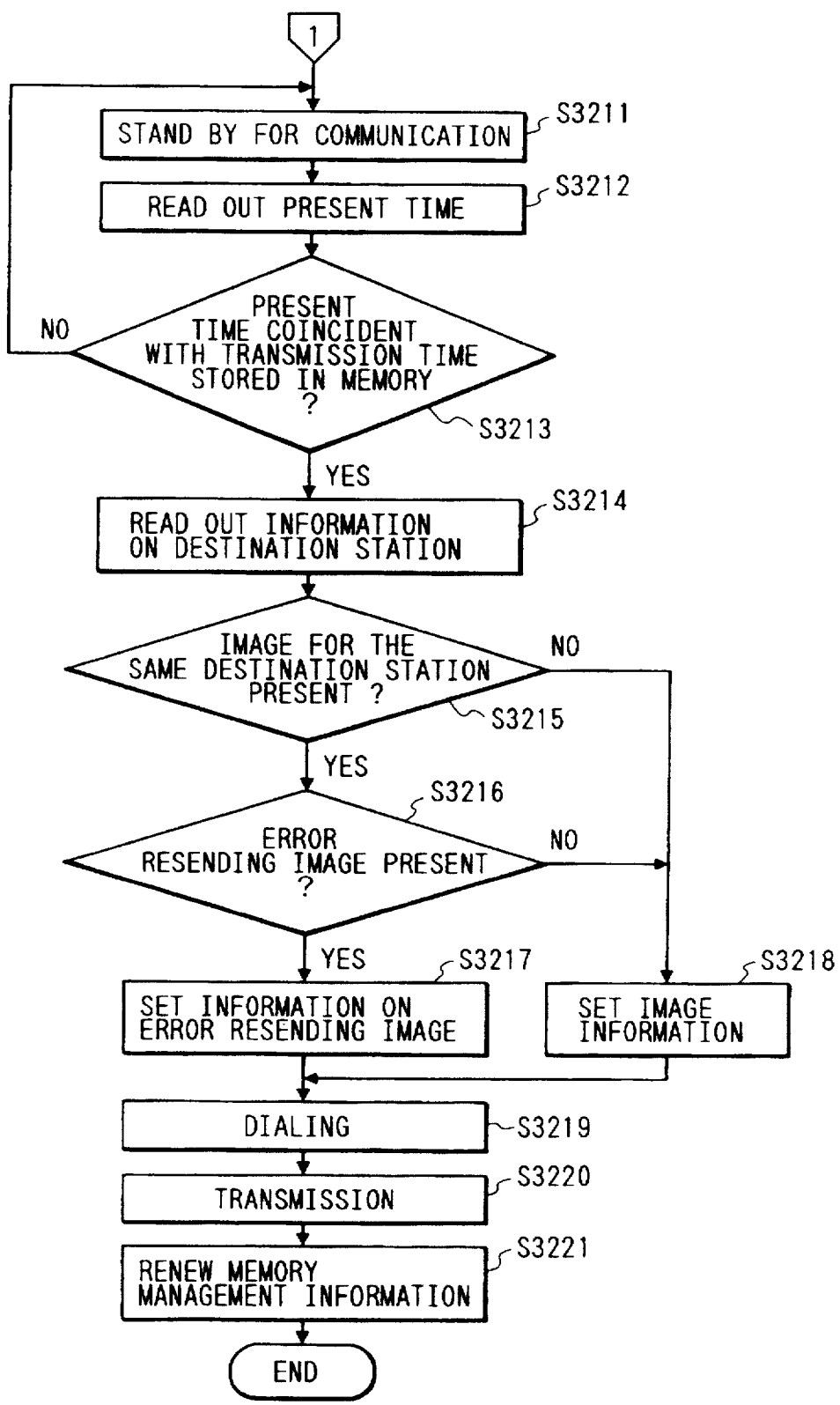
FIG. 14 shows a flow chart of a fifth embodiment.

A process flow in the retransmission in the Embodiment 5 is shown in FIG. 14.

Figure 15:
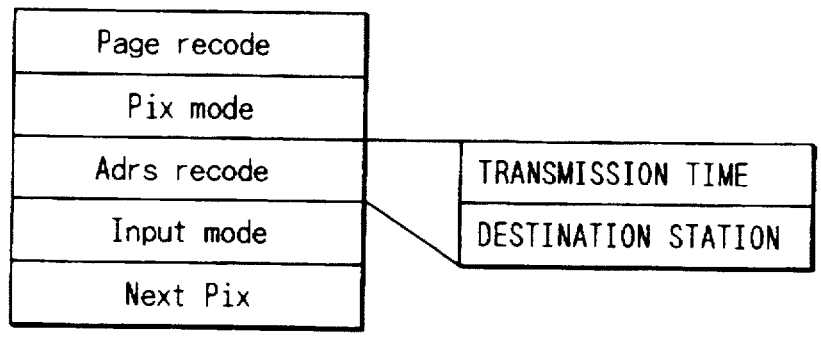
FIG. 15 shows a content of memory management information in the fifth embodiment.

A content of the memory management information in the Embodiment 5 is shown in FIG. 15.

The memory management information is provided for each image data to be transmitted.

In FIG. 3, when the communication error is detected (s209), the transmission with error is stored in the image attribute of the memory management data (s210), and the process shifts to the stand-by state for the transmission (s3211). The image memory stores a plurality of transmission reserved image data in addition to the image data for the error retransmission.

The current time is compared with the transmission time of the destination information of the memory management information to the individual images stored in the memory (s3212, s3213), and if they match, the transmission destination is read (s3214). The transmission destination information of other image is searched and if the same destination as the previous destination is present (s3215) and if it is the image file of the error retransmission (s3216), the error retransmission image information is set with a higher priority than the image data which reached the transmission time (s3217). Otherwise, the previous image information is set (s3218). The dialing is conducted (s3219) and the image data is transmitted (s3220). The memory management information is updated (s3221) and the process shifts to the transmission stand-by state.

In the Embodiment 5, in the memory transmission, the error is detected by the communication error detection means, the occurrence of the error is stored in association with the image information, and the image to be error retransmitted is recognized, and when the image file to be next transmitted is set, if a plurality of transmission reservations to one destination station are detected, the retransmission of the communication error image is prioritizes to prevent the disorder of the retransmitted image data received at the receiving station.

What is claimed is:

1. A facsimile apparatus capable of recalling a destination for retransmission when a transmission operation ends with a transmission error, comprising:

memory means for storing a sequential plurality of pages of image data starting with a first page;

transmission means for transmitting page-by-page the pages of image data stored in said memory means in a transmission operation to a destination;

detection means for detecting a transmission error during transmission of one of the pages;

management means for identifying the one page as an error page;

line control means for terminating the transmission operation with error and for recalling the destination in a retransmission operation in response to said detecting means detecting the transmission error; and retransmission means for causing said transmission means to transmit, to the destination recalled by said line control means in the retransmission operation, pages including only the first page, the error page and any of the plurality of pages of image data following the error page.

2. A facsimile apparatus according to claim 1, further comprising release means for releasing, from said memory means, any of the plurality of pages stored in said memory means that were normally transmitted by said transmission means without transmission error as normally transmitted pages.

3. A facsimile apparatus according to claim 2, wherein said release means releases each normally transmitted page as soon as said transmission means completes transmission of that normally transmitted page.

4. A facsimile apparatus according to claim 2, wherein said release means waits until said detection means detects a transmission error to release any normally transmitted pages.

5. A facsimile apparatus according to claim 2, further comprising second detection means for detecting, before said line control means recalls the destination, a presence of image data for another transmission operation, wherein said retransmission means is responsive to detection of the presence of the other transmission to cause said transmission means to perform the retransmission operation prior to the other transmission.

6. A facsimile apparatus capable of recalling a destination for retransmission without retransmitting all pages correctly transmitted when a transmission operation ends with a transmission error, comprising:

memory means for storing a sequential plurality of pages of image data; and retransmission means for, when a transmission operation of the plurality of pages ends with a transmission error occurring during transmission of one of the pages, retransmitting, in a subsequent transmission, pages including only a first one of the pages that was correctly transmitted without a transmission error, the one page during transmission of which the transmission error was detected, and any of the plurality of pages following the one page.

7. A facsimile apparatus according to claim 6, further comprising selection means for selecting one of a first mode for said retransmission means to retransmit all of the plurality of pages, a second mode for said retransmission means to retransmit the one page and any of the plurality of pages following the one page, and a third mode for said retransmission means to retransmit the first page, the one page and any of the plurality pages following the one page.

8. A facsimile apparatus capable of recalling a destination for retransmission when a memory means for storing a sequential plurality of pages of image data;

retransmission means for, when a transmission operation of the plurality of pages ends with a transmission error occurring during transmission of one of the pages, retransmitting in a separate transmission the one page stored in said memory means; and selection means for selecting one of a first mode for said retransmission means to retransmit all of the plurality of pages, and a second mode for said retransmission means to retransmit pages including only the one page and any of the plurality of pages following the one page.

9. A method of operating a facsimile apparatus capable of recalling a destination for retransmission when a transmission operation ends with a transmission error, comprising the steps of:

storing a sequential plurality of pages of image data starting with a first page;

transmitting page-by-page the pages of image data stored in said memory step in a transmission operation to a destination;

detecting a transmission error during transmission of one of the pages;

identifying the one page as an error page;

terminating the transmission operation with error and recalling the destination in a retransmission operation in response to said detecting step detecting the transmission error; and causing said transmission means to transmit, to the destination recalled in the retransmission operation, pages including only the first page, the error page and any of the plurality of pages of image data following the error page.

10. A method according to claim 9, further comprising a release step for releasing any of the plurality of pages stored in said memory step that were normally transmitted by said transmission step without transmission error as normally transmitted pages.

11. A method according to claim 10, wherein said release step releases each normally transmitted page as soon as said transmission step completes transmission of that normally transmitted page.

12. A method according to claim 10, wherein said release step waits until said detection step detects a transmission error to release any normally transmitted pages.

13. A method according to claim 10, further comprising a second detection step for detecting, before said method recalls the destination, a presence of image data for another transmission operation, wherein said method is responsive to detection of the presence of the other transmission to cause said transmission step to perform the retransmission operation prior to the other transmission.

14. A method of operating facsimile apparatus capable of recalling a destination for retransmission without retransmitting all pages correctly transmitted when a transmission operation ends with a transmission error, comprising:

storing a sequential plurality of pages of image data; and when a transmission operation of the plurality of pages ends with a transmission error occurring during transmission of one of the pages, retransmitting in a subsequent transmission a first one of the pages that was correctly transmitted without a transmission error, pages including only the one page during transmission of which the transmission error was detected, and any of the plurality of pages following the one page.

15. A method according to claim 14, further comprising a selection step for selecting one of a first mode for said retransmission step to retransmit all of the plurality of pages, a second mode for said retransmission step to retransmit the one page and any of the plurality of pages following the one page, and a third mode for said retransmission step to retransmit the first page, the one page and any of the plurality pages following the one page.

16. A method of operating a facsimile apparatus capable of recalling a destination for retransmission when a transmission operation ends with a transmission error, comprising:

storing a sequential plurality of pages of image data;

when a transmission operation of the plurality of pages ends with a transmission error occurring during transmission of one of the pages, retransmitting in a separate transmission the one page stored in said storing step; and selecting one of a first mode for said retransmission step to retransmit all of the plurality of pages, and a second mode for said retransmission step to pages, and a second mode for said retransmission step to retransmit pages including only the one page and any of the plurality of pages following the one page.

* * * * *

UNITED STATES PATENT AND TRADEMARK OFFICE
CERTIFICATE OF CORRECTION

PATENT NO. : 5,896,204

DATED : April 20, 1999

INVENTOR(S): AKEMI SATO, ET AL.

It is certified that error appears in the above-identified patent and that said Letters Patent is hereby corrected as shown below:

COLUMN 8

Line 39, "plurality" should read --plurality of--.

COLUMN 10

Line 15, "plurality" should read --plurality of--;
Line 28, "pages, and a" should be deleted; and
Line 29, "second mode for said retransmission step to" should be deleted.

Signed and Sealed this

Eleventh Day of January, 2000

Attest:

Q. TODD DICKINSON

Attesting Officer

Acting Commissioner of Patents and Trademarks